US010853981B2

(12) United States Patent
Nicolson et al.

(10) Patent No.: US 10,853,981 B2
(45) Date of Patent: Dec. 1, 2020

(54) TIMELINE SYSTEM FOR MONITORING A CULTURE MEDIA PROTOCOL

(71) Applicant: Becton, Dickinson and Company, Franklin Lakes, NJ (US)

(72) Inventors: Strett Roger Nicolson, Owings Mills, MD (US); Keri Lynne Jones Aman, Lutherville, MD (US); Mark Sakowski, Cockeysville, MD (US); Paul Fieni, Sparks, MD (US); Mark Larsen, Sparks, MD (US); Amy Alcott Llanso, Henderson, NV (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

(21) Appl. No.: 16/348,841

(22) PCT Filed: Nov. 9, 2017

(86) PCT No.: PCT/US2017/060928
§ 371 (c)(1),
(2) Date: May 9, 2019

(87) PCT Pub. No.: WO2018/089681
PCT Pub. Date: May 17, 2018

(65) Prior Publication Data
US 2020/0211244 A1 Jul. 2, 2020

Related U.S. Application Data

(60) Provisional application No. 62/420,466, filed on Nov. 10, 2016.

(51) Int. Cl.
*G06T 11/60* (2006.01)
*G06K 9/00* (2006.01)
(Continued)

(52) U.S. Cl.
CPC .......... *G06T 11/60* (2013.01); *G06K 9/00744* (2013.01); *G06T 13/80* (2013.01); *H04N 7/183* (2013.01); *G06T 2200/24* (2013.01)

(58) Field of Classification Search
CPC ....... G06T 7/0012; G06T 11/60; G06T 13/80; G06T 2200/24; G06F 16/44; G06F 16/447; G06F 16/54; G06F 16/74
See application file for complete search history.

(56) References Cited

U.S. PATENT DOCUMENTS

2008/0273786 A1   11/2008   Komori
2012/0185226 A1   7/2012    Famili
(Continued)

FOREIGN PATENT DOCUMENTS

WO   WO 2013/147610 A1   10/2013
WO   WO 2016/191646 A2   12/2016

OTHER PUBLICATIONS

International Search Report and Written Opinion dated Jan. 23, 2018 for PCT/US2017/060928, filed Nov. 9, 2017.

*Primary Examiner* — Jeffery A Brier
(74) *Attorney, Agent, or Firm* — Knobbe, Martens Olson & Bear, LLP

(57) ABSTRACT

Systems and methods are provided for providing a timeline representing a culture media protocol for a culture medium. Providing a timeline representing a culture media protocol can include receiving the culture media protocol for the culture media generating the timeline on a user interface based on the culture media protocol, monitoring time on the timeline, receiving one or more culture media images related to the culture media protocol, associating each of the one or more culture media images with a position on the timeline that correlates to a time at which the culture media image was captured, and generating a selectable marker for each culture media image associated with the timeline, the select- (Continued)

able marker being aligned with the position on the timeline that correlates to the time at which the culture media image was captured.

20 Claims, 10 Drawing Sheets

(51) Int. Cl.
*G06T 13/80* (2011.01)
*H04N 7/18* (2006.01)

(56) References Cited

U.S. PATENT DOCUMENTS

| | | | |
|---|---|---|---|
| 2013/0316445 A1 | 11/2013 | Beardsley | |
| 2015/0016700 A1* | 1/2015 | Drozdzal | G06T 11/60 |
| | | | 382/128 |
| 2015/0030613 A1* | 1/2015 | Aebi | A61P 1/04 |
| | | | 424/164.1 |
| 2018/0182092 A1* | 6/2018 | Drozdzal | G06K 9/00765 |

* cited by examiner

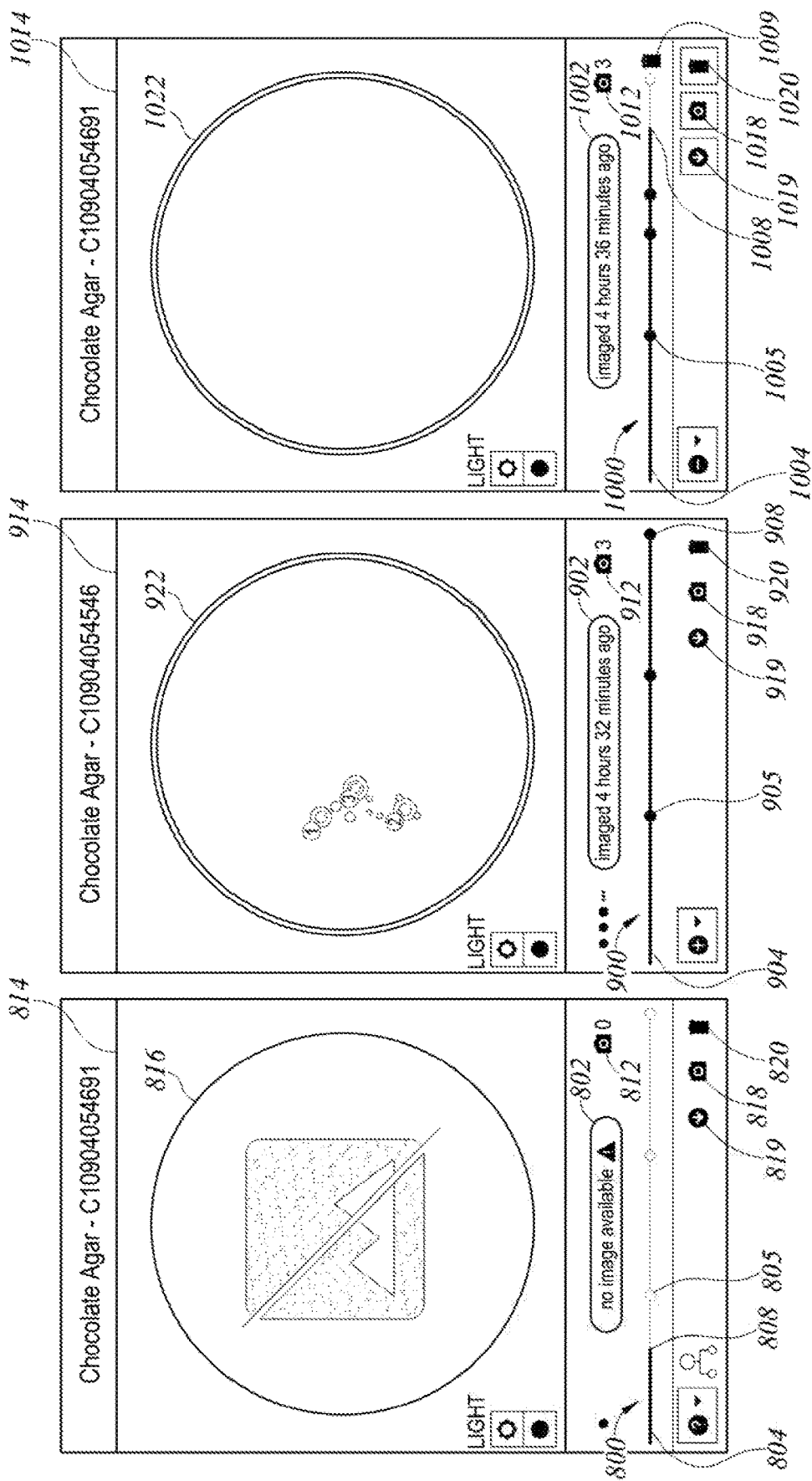

TIMELINE SYSTEM FOR MONITORING A CULTURE MEDIA PROTOCOL

RELATED U.S. APPLICATIONS

This application claims priority to U.S. Provisional Appl. No. 62/420,466 filed on Nov. 10, 2016, which is hereby incorporated by reference in its entirety.

BACKGROUND

Field

This invention relates to culture media analysis, and more particularly to software for presenting and reviewing culture media information.

Description of the Related Art

Methods and systems for capturing an image of a culture media and displaying the image on a display are known. Such systems and methods are described, for example, WO2013/147610 to Botma et al., the disclosure of which is incorporated by reference herein.

SUMMARY

Aspects of the invention include systems, devices, and methods for presenting and manipulating data elements for a cell culture media protocol for a culture media using a timeline presented on a user interface.

One embodiment is a system for providing a timeline representing a culture media protocol for culture media. The system includes a computer system. The computer system includes a user interface configured to display the timeline and a field for optional display of a culture media image and a processor. The processor is configured to receive the culture media protocol for the culture media, generate the timeline on the user interface based on the culture media protocol, monitor time on the timeline, receive one or more culture media images related to the culture media protocol, associate each of the one or more culture media images with a position on the timeline that correlates to a time at which the culture media image was captured, and generate and display a selectable marker for each culture media image associated with the timeline, the selectable marker being aligned with the position on the timeline that correlates to the time at which the culture media image was captured.

Another embodiment is a method for providing a timeline representing a culture media protocol for a culture media. The method includes receiving the culture media protocol for the culture media, generating the timeline on a user interface based on the culture media protocol, monitoring time on the timeline, receiving one or more culture media images related to the culture media protocol, associating each of the one or more culture media images with a position on the timeline that correlates to a time at which the culture media image was captured, and generating a selectable marker for each culture media image associated with the timeline, the selectable marker being aligned with the position on the timeline that correlates to the time at which the culture media image was captured.

BRIEF DESCRIPTION OF THE DRAWINGS

FIG. 8 depicts an embodiment of a timeline on a timeline display screen in accordance with an illustrative embodiment of the present invention.

FIG. 9 depicts an embodiment of a timeline on a timeline display screen in accordance with an illustrative embodiment of the present invention.

FIG. 10 depicts an embodiment of a timeline on a timeline display screen in accordance with an illustrative embodiment of the present invention.

DETAILED DESCRIPTION

Figure 1:
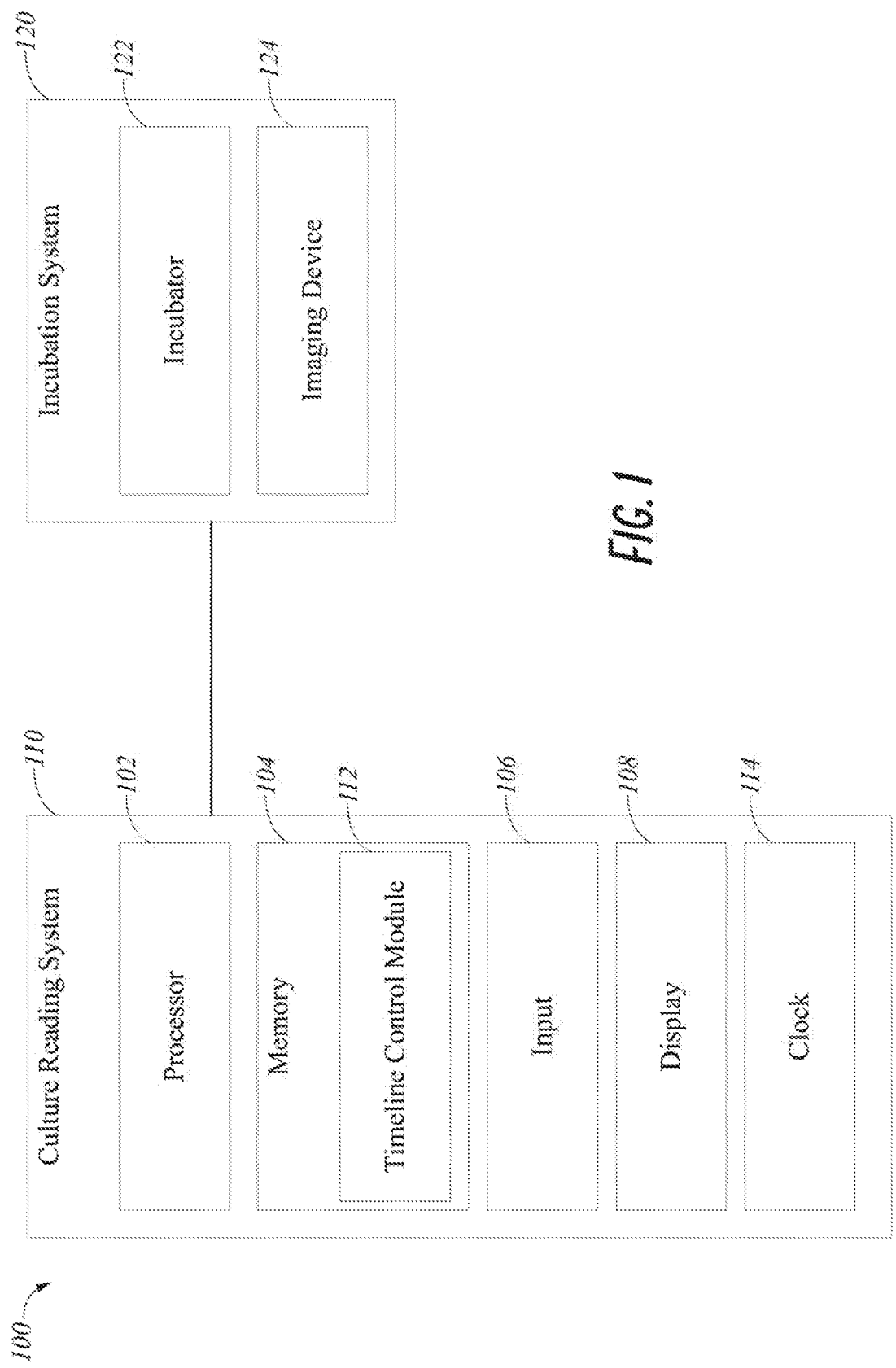
FIG. 1 depicts a schematic view of a timeline control system in accordance with an illustrative embodiment of the present invention.

As will be appreciated by one skilled in the art, there are numerous ways of carrying out the examples, improvements, and arrangements for timeline control in accordance with embodiments of the invention disclosed herein. Although reference will be made to the illustrative embodiments depicted in the drawings and the following description, these embodiments are not meant to be exhaustive of the various alternative designs and embodiments that are encompassed by the disclosed invention. Those skilled in the art will readily appreciate that various modifications may be made, and various combinations can be made, without departing from the invention.

Embodiments relate to systems and methods for presenting and manipulating data elements for a cell culture media protocol for a culture media using a timeline presented on a user interface. In one embodiment, the system generates a timeline on a user interface based on a culture media protocol for a particular culture media. During implementation of the culture media protocol, the timeline can be updated continuously or semi-continuously to reflect the passage of time throughout the protocol and the occurrence of protocol related events, such as the capture of an image of the culture media. The system may generate markers on the timeline that represent protocol related events that are expected to occur during the implementation of the protocol and/or protocol events that do occur during implementation of the protocol. The user interface allows the markers to be selected by a user and in response to the selection of a marker provides further data relating to that marker.

In one embodiment, the system captures a plurality of culture media images throughout the culture protocol. Each culture media image is associated with a position on the timeline that represents the time at which the culture media image was captured. A marker can be generated for each culture media image at the position on the timeline that represents the time at which the culture media image was captured. The user interface can allow for selection of one of the markers to cause the user interface to display the associated culture media image. In some embodiments, image processing software analyzes each culture media image associated with the culture media protocol and aligns the culture media images so that each image is presented in the same orientation when the marker associated with that image is selected. This feature allows a user to navigate between culture media images to monitor growth on the culture media.

FIG. 1 depicts a schematic view of an illustrative embodiment of a timeline control system 100. The timeline control system 100 includes a culture reading system 110 and an incubation system 120.

The incubation system 120 includes an incubator 122 and an imaging device 124. The incubator 122 can be configured to house and incubate one or more culture media containing microorganisms and growth media for culturing the growth of the microorganisms. The culture media can be culture plates, such as petri dishes. The imaging device 124 can be configured to capture and store images of the culture media housed within the incubator 122. In some embodiments, the incubation system 120 is a ReadA Compact incubator.

The incubation system 120 can be configured to communicate with the culture reading system 110 via wired or wireless communication, cell communication, Bluetooth®, ZigBee®, LAN, WLAN, RF, TR, or any other communication method or system known in the art. For example, the incubation system 120 can be configured to transmit images of culture plates housed within the incubator 122 to the culture reading system 110.

The culture reading system 110 includes a processor 102, a memory 104, an input 106, a display 108, and a clock or timer 114. The memory 104, which can include both read-only memory (ROM) and random access memory (RAM), can be configured to provide instructions and data to the processor 102. For example, the memory 104 can store one or more modules that store data values defining instructions to configure processor 102 to perform functions of the culture reading system 110. As shown in FIG. 1, the memory 104 includes a timeline control module 112 that includes instructions that configure the processor 102 to perform timeline control functions as described herein. The memory 104 can also be configured to store images of culture media received from the incubation system 120.

The display 108 can be configured to display data from the memory 104 and data received from the input 106. The input 106 can include one or more devices that allow a user to input data into the culture reading system 110. For example, the input 106 can include a keyboard, a mouse, and/or a touch screen in connection with the display 108. The input 106 and display 108 can operate to form a user interface presented on the display 108. The user interface can include one or more interactive display screens which provide culture media data to a user and allow for data selection and manipulation.

In an illustrative embodiment of the present invention, the culture reading system 110 can be configured to display an interactive timeline display screen on the display 108. The timeline display screen can facilitate presentation and manipulation of data elements for a culture media protocol associated with a culture media based on instructions stored within the timeline control module 112. In some embodiments, the timeline display screen can be displayed in response to a timeline initiation event, such as a command from a user via the input 106.

In some embodiments, the timeline control module 112 is configured to cause the culture reading system 110 to provide a timeline within the timeline display screen representing events of a predetermined culture media protocol for a culture media. The timeline can provide a relative timescale for the culture media protocol in which the expected duration of time for the culture media protocol is correlated to the length of the timeline and each point on the timeline is representative of a particular time within the culture media protocol. The timeline can include one or more markers that represent events of the culture media protocol. In some embodiments, markers are provided to represent events that are expected to occur within the culture media protocol but have not yet occurred. Such a marker can be aligned with a position on the timeline that correlates to the time within the culture media protocol at which the event is expected to occur. The timeline can also be updated during the culture media protocol or after completion of the culture media protocol to include markers representing events of the culture media protocol that have occurred. Such a marker can be aligned with a position on the timeline that correlates to the time within the culture media protocol at which the event occurred. Representative events of a culture media protocol can include, for example, the start of the culture media protocol, the end of a culture media protocol, the capturing of an image of the culture media, removal of the culture media from the incubator 122 or incubation system 120, placement of the culture media into the incubator 122 or incubation system 120, and the collection or processing of data related to the culture media, such as, for example, the processing of an image of the culture media by a digital image analysis algorithm. In some embodiments, a marker can be aligned with a position on the timeline that correlates to an interim result provided by a data processing algorithm, such as a digital image analysis algorithm. In some embodiments, a marker can be aligned with a position on the timeline that correlates to a final result provided by a data processing algorithm, such as a digital image analysis algorithm.

The timeline display screen can provide a variety information relating to the timing of culture media protocol events. For example, the timeline display screen can provide: the date and/or time of an event of the culture media protocol, the date and/or time of an expected event of the culture media protocol, a relative time difference between an event of the culture media protocol and a current time, an indication that an event of the culture media protocol has not been performed, a date and/or time at which the culture media protocol started, a date and/or time at which the culture media protocol is expected to start, a date and/or time at which the culture media protocol ended, a date and/or time at which the culture media protocol is expected to end, a relative time difference between the start of the culture media protocol and a current time, and a relative time difference between the current time and the time at which the culture media protocol is expected to end.

As described herein, a representative culture media protocol event can include the capture of an image of the culture media undergoing the culture media protocol. The timeline display screen can be configured to display one or more culture media images captured as part of the culture protocol. The culture media images can be retrieved from the memory 104, received from the incubation system 120, and/or received from another external device. In some embodiments, the timeline display screen can also be configured to provide additional information related to culture media images captured as part of the culture media protocol or expected to be captured as part of the culture media protocol. For example, in addition to the timing information for culture media protocol events, the timeline display screen can provide an indication of which culture media image is currently being displayed on the timeline display screen when multiple culture media images have been captured, the number of culture media images that have been captured as of the current time within the culture media protocol, and if a culture media image has not been captured as of the current time within the culture media protocol.

In some embodiments, the timeline display screen can allow for the selection and/or manipulation of data presented on the timeline display screen, for example, via the input 106. In some embodiments, a marker can be associated with a link that when selected, provides further information about an event of the culture media protocol represented by that marker. For example, a marker representing the capture of a culture plate image can be linked to the corresponding culture plate image. A marker representing a result of a data processing algorithm, such as an image analysis algorithm, can be linked to a corresponding result of the algorithm. In some embodiments, the marker can be selected to retrieve a corresponding image of the culture media from the memory 104 and to display the corresponding image on the timeline display screen on the display 108.

In some embodiments, the timeline display screen can allow for modifications to the culture media protocol, for example, via the input 106. The timeline display screen can include one or more selectable options that when selected can cause the culture reading system to modify the culture media protocol. For example, in some embodiments, the timeline display screen can include an option that when selected causes an additional culture media image to be captured. In some embodiments, the timeline display screen can include an option that when selected causes the termination of the culture media protocol. In some embodiments, the timeline display screen can include an option that when selected causes the culture media protocol to extend. In some embodiments, an amount of time for extension of the culture media protocol can be input into the timeline display screen.

The timeline display screen can also be configured to display indications of modifications to the culture media protocol. For example, the timeline display screen can be configured to provide an indication that culture media has been physically discarded, an indication that the culture media protocol has been terminated, and/or an indication that the culture media protocol has been extended.

In some embodiments, a timeline generated by culture reading system 110 can conform to a predetermined width. The timeline can provide a relative timescale between events of the culture media protocol. In other words, the physical distance between markers representing events on the timeline is correlated to the length of time between the events represented by the indicators.

In some embodiments, the timeline control module 112 is configured to cause the culture reading system 110 to update the timeline in real time or near real time. For example, in some embodiments, the culture reading system 110 can provide a visual indication of the time elapsed from the beginning of the culture media protocol to the current time. The visual indication can be a change in the appearance of the timeline over the length of the timeline that correlates to the period of time between the start of the culture media protocol and the current time. The timeline can be updated to in real time or near real time to change the appearance of the timeline to indicate the passage of time from the beginning of the culture media protocol. The culture reading system 110 can also update the timeline in response to receiving data related to an event of the culture media protocol, for example, in response to receiving a culture media image, removal of the culture media from the incubator 122 or incubation system 120, placement of the culture media into the incubator 122 or incubation system 120, or the collection or processing of data related to the culture media. In response to receipt of a culture media image, the timeline control module 112 can be configured to cause the culture reading system 110 to associate the culture media image with a position on the timeline representative of the time of the capture of the culture media image. The culture reading system can also be configured to generate a marker on the timeline associated with the culture media image. In some embodiments, the culture reading system can be configured to generate a marker on the timeline associate with one or more of removal of the culture media from the incubator 122 or incubation system 120, placement of the culture media into the incubator 122 or incubation system 120, and the collection or processing of data related to the culture media.

In some embodiments, the culture reading system 110 can provide a visual indication of the time elapsed between two events of the culture media protocol or the time elapsed after an event of the culture media protocol has occurred. For example, in some embodiments, the visual indication can be a change in the appearance of the timeline over the length of the timeline that correlates to the period of time between the placement of the culture media in the incubator 122 or incubation system 120 and the removal of the culture media from the incubator 122 or incubation system 120. In some embodiments, the visual indication can be a change in the appearance of the timeline over the length of the timeline that correlates to the period of time between the removal of the culture media from the incubator 122 or incubation system 120 and the placement of the culture media in the incubator 122 or incubation system 120. In some embodiments, the visual indication can be a change in the appearance of the timeline over the length of the timeline that correlates to the period of time after removal of the culture media from the incubator 122 or incubation system 120. In some embodiments, the visual indication can be a change in the appearance of the timeline over the length of the timeline that correlates to the period of time after placement of the culture media in the incubator 122 or incubation system 120.

In some embodiments, the timeline control module 112 can be configured to cause the culture reading system 110 to align the culture media images associated with a culture media protocol such that the culture media is shown in the same orientation in each image. The culture reading system 110 can be configured to determine the orientation of each image using image processing software, for example, to detect and analyze indicators on the culture media. The culture reading system 100 can then orient each image so that the indicators on the culture media are presented in the same location on each image. For example, for culture media protocols including culture plates having a divider, the culture reading system 110 can be configured to orient the culture media images such that the media on each side of the divider is shown on the same side of each culture media image.

The clock 114 can allow for dates and/or times to be associated with the events of the culture media protocol. For example, the clock can be configured to associate a date and/or time with a culture media image. In some embodiments, the imaging device 124 can be configured to record the date and/or time at which the image was captured and to provide that date and to provide the date and/or time to the culture reading system 110. The clock 114 can also allow for determinations of durations of time between events of the culture media protocol and/or the current time within the culture media protocol.

The timeline control module 112 can also be configured to cause the culture reading system 110 to initiate an animation mode. In the animation mode, a video or animation is generated from a series of captured images that shows any culture media images captured during the culture media protocol in chronological order. The video or animation can provide a time-lapse progression of bacterial growth on the culture media.

In some embodiments, a timeline display screen can display multiple timelines, each timeline representing a different culture media protocol. A timeline display screen can also display multiple culture media images related to the same culture media protocol.

Figure 2:
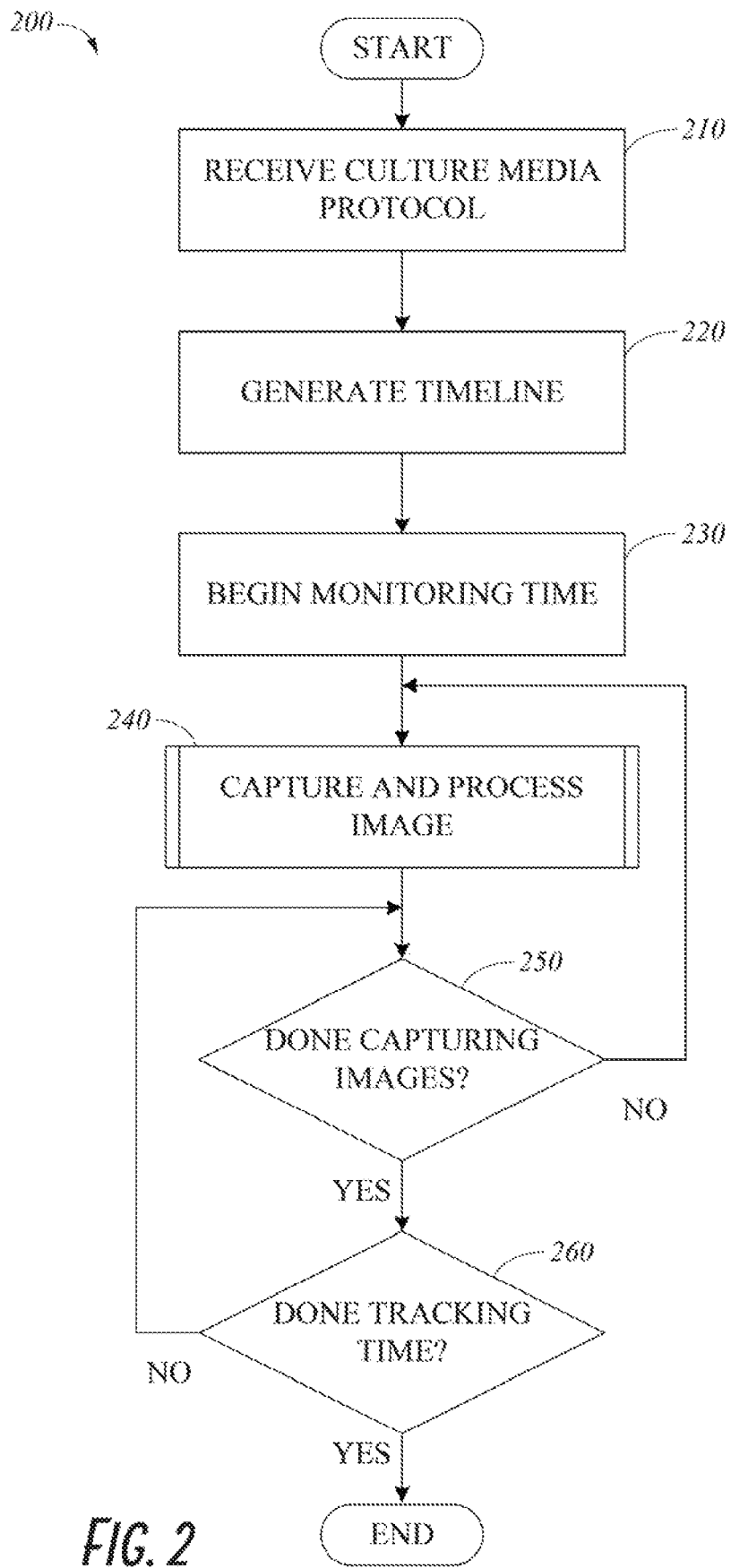
FIG. 2 depicts a flowchart of an embodiment of providing a timeline control system in accordance with an illustrative embodiment of the present invention.

FIG. 2 depicts a flowchart of a process 200 of an illustrative embodiment of a method for providing a timeline control system using a culture reading system such as reading system 110. The process 200 begins at a step 210, wherein a culture media protocol is received for a culture media. A culture media protocol can include an intended length of time of the culture media protocol, an intended number of culture media images to be captured during the protocol, a date and/or time at with each culture media image is intended to be captured, an identification of one or more organisms on the culture media, and an identification of one or more media types on the culture plate. The culture media protocol can be received via an input, such as input 106, as an entry or selection from a user. The culture media protocol can also be received from a database or memory, such as the memory 104. A culture media protocol may be a custom protocol or a protocol retrieved from a list of common protocols or previously received protocols.

After the culture media protocol is received, the process 200 moves to a step 220 wherein a timeline is generated. The timeline can be generated by a processor, such as processor 102, running a software application. The timeline can include information related to the culture media protocol. For example, the timeline can include an expected start time, an expected end time, a time or times at which one or more images are expected to be captured in accordance with the culture media protocol, and/or a time or times at which any other culture media protocol events are expected to occur. In some embodiments, culture media protocol events can include removal of the culture media from an incubator or incubation system, placement of the culture media into the incubator or incubation system, and the collection or processing of data related to the culture media, such as, for example, the processing of an image of the culture media by a digital image analysis algorithm. The expected date and/or time of one or more protocol events, such as the capturing of an image of the culture media, can be indicated on the timeline using a marker. The markers can be positioned on the timeline in accordance with a relative timescale such that the physical distance between markers on the timeline is representative of the length of time between the events represented by the markers.

After the timeline is generated, the process 200 moves to a step 230, wherein the incubation time of the plate begins to be monitored on the timeline. Time can be monitored on the timeline using a clock or timer, such as clock 114. For example, a processor, such as processor 102, running a software application can receive time data from the clock and use the time data to monitor time on the timeline. As time is monitored, the culture reading system can be configured to update the visual timeline in real time or near real time to indicate the amount of time elapsed from the start time of the protocol. In some embodiments, a graphical or numerical indication is provided showing an amount of time elapsed since the beginning of the protocol. In some embodiments, a graphical or numerical indication is provided to indicate the expected amount of time remaining in the protocol. In some embodiments, a graphical or numerical indication can be provided to indicate an expected amount of time remaining until a next event in the protocol. In some embodiments, a graphical or numerical indication can be provided indicating an amount of time since a previous event in the protocol. In some embodiments, the appearance of the timeline is configured to change to indicate the amount of time elapsed from the start of the culture media protocol. For example, a section of the timeline representing the time period between the start time of the culture media protocol and the current time within the culture media protocol can be indicated using a different color and/or size than the rest of the timeline. In some embodiments, the appearance of the timeline is configured to change to indicate the amount of time elapsed between events of the culture media protocol or the amount of time elapsed after an event of the culture media protocol has occurred.

After time starts to be monitored, the process 200 moves to a process step 240, wherein a culture media image is captured and processed. A processed culture media image can be associated with a marker added to the timeline as explained with respect to FIG. 3.

After the culture media image is captured and processed, the process 200 moves to a decision step 250, wherein a decision is made whether culture media images are finished being captured in accordance with the culture media protocol. A processor, such as processor 102, running a software application can determine that culture media images are done being captured when no more images are scheduled as part of the culture media protocol. Culture media images can be scheduled in the initial received protocol or added at a later time, for example, via a user input. If a culture media image is added after the initial generation of the timeline, the timeline can be modified to include a marker representing the expected time at which the image will be captured. If images are not finished being captured, the process 200 returns to step 240.

If images are finished being captured, the process 200 moves to a decision step 260. Wherein a decision is made whether the culture reading system is finished tracking time. The culture reading system can be finished tracking time when the estimated end time of the culture media protocol is reached. In some embodiments, the end time of the protocol can be modified in response to one or more events. A culture media protocol may be terminated early, for example, in response to an input by a user or an error. A culture media protocol may also be extended, for example, in response to an input by a user. The timeline can be modified to add an additional length of the timeline representative of the amount of time for which the protocol is to be extended. In some embodiments, the timeline does not change in length, but instead the scale of the timeline is adjusted to correspond to the adjusted total length of the time represented by the timeline. The culture media protocol may be extended at any time throughout the process 200. The culture reading system can be configured to determine if an end time of the protocol is modified and can stop tracking time at the modified end time. A processor, such as processor 102, can be configured to determine that the culture system is finished tracking time. If it is determined that the culture reading system is not finished tracking time, the process 200 returns to step 250. If it is determined that time is finished being tracked, the process 200 concludes at an end step.

Figure 3:
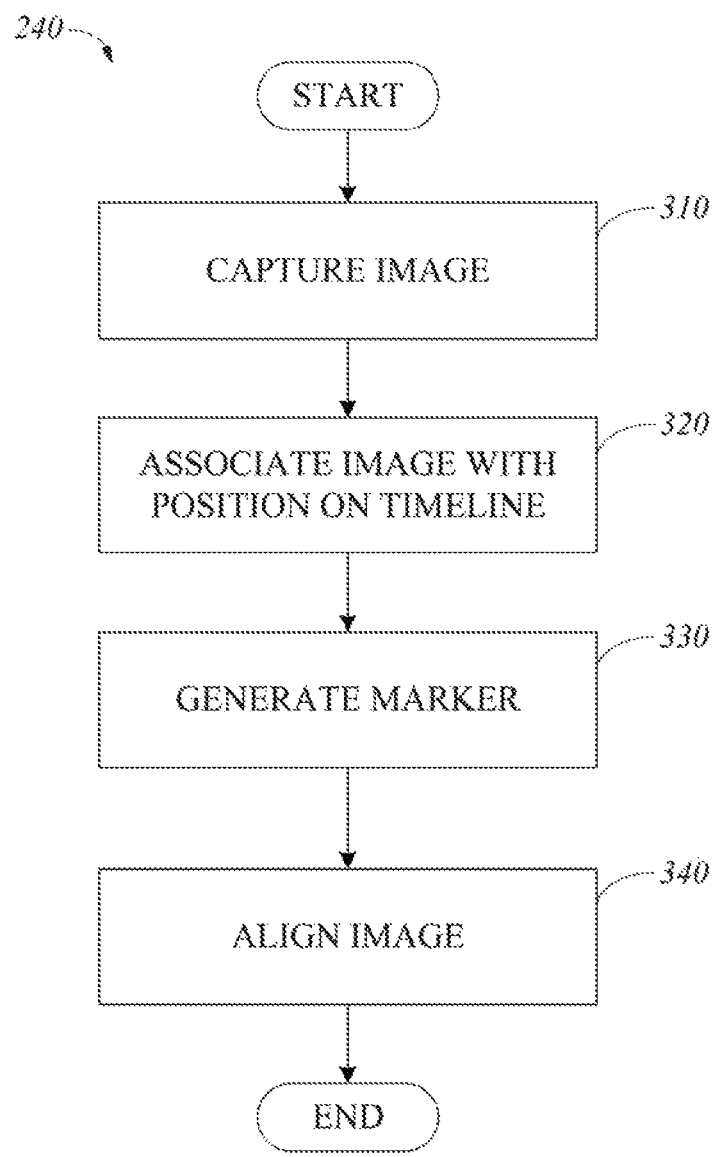
FIG. 3 depicts a flowchart of an embodiment of capturing and processing a culture media image in accordance with an illustrative embodiment of the present invention.

FIG. 3 depicts a flowchart of an illustrative embodiment of the process 240 for capturing and processing a culture media image. The process begins at a step 310 wherein the culture media image is captured. The culture media image can be captured by an imaging device, such as imaging device 124. In some embodiments, the culture reading system is configured to cause the culture media image to be captured at the estimated time for capture of the culture media image as provided by the culture media protocol received in step 210 of the process 200. A processor, such as processor 102, running a software application can cause the culture reading system to provide instructions to the imaging device to capture an image at the estimated time. The culture reading system can also provide instructions to the imaging device to transmit the captured image to the culture reading system for further processing. In some embodiments, the imaging device can capture an image in response to an instruction from a processor running a software program independent of the estimated time for capturing an image. In some embodiments, the scheduled time for capturing an image can be modified by the user. In some embodiments, a user can provide an instruction for an image of the culture media to be captured at any time during the culture media protocol. In some embodiments, a user can manually capture an image using the imaging device.

After the culture media image is captured, the process 240 moves to a step 320, wherein the culture media image is associated with a position on the timeline representative of the time at which the culture media image was captured. In some embodiments, the imaging device is configured to record the date and time at which the culture media image is captured and to transmit the date and time to the culture reading system. In some embodiments, a processor, such as processor 102, running a software application in conjunction with a clock or timer, such as clock 114, can correlate the date and time at which the image was captured with a position representing that time on the timeline. In some embodiments, each point on the timeline can be assigned a date and/or upon generation of the timeline in accordance with the start time of the culture media protocol and the expected duration of the culture media protocol. An image taken at a particular date and/or time can be correlated with a corresponding date and/or time as assigned to a point on the timeline. Alternatively, the culture reading system can be configured to determine a difference in time between the start time of the culture media protocol and the time at which the culture media image was captured. The culture reading system can then determine a physical length of the timeline starting at the beginning of the timeline that corresponds to the difference in time between the start of the culture media protocol and the time at which the culture image was captured and can associate the image with an end point of the determined physical length of the timeline.

After the image is associated with a position on the timeline, the process 240 moves to a step 330, wherein a marker associated with the image is generated on the timeline. A processor, such as processor 102, running a software application can cause culture reading system to generate the marker. The marker can be aligned with the position on the timeline that is associated with the captured image. In some embodiments, the marker can provide a link to the captured image. For example, in response to a selection of the marker on the timeline display screen, the associated image can be displayed.

After the image is associated with an indicator on the timeline, the process 240 moves to a step 340, wherein the image is aligned with any previously captured images of the culture media. The culture media image can be aligned by a processor, such as processor 102, running image processing software. The culture reading system can be configured to determine the orientation of each image using image processing software, for example, to detect and analyze reference points on the culture plate. The culture reading system can then orient each image so that any reference points on the culture plate are presented in the same location on each image, for example, by rotating the culture media image to conform to the alignment of the previously captured culture media images. After the culture plate image is aligned, the process 240 concludes.

Figure 4:
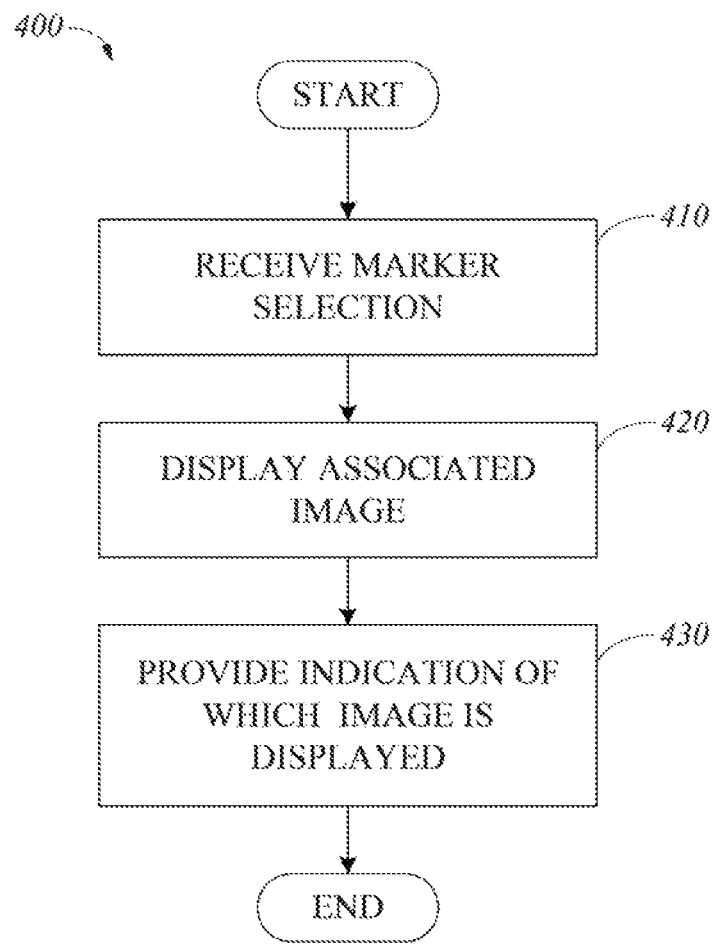
FIG. 4 depicts a flowchart of an embodiment of providing an indication of which culture media image is displayed on a timeline in accordance with an illustrative embodiment of the present invention.

FIG. 4 depicts a flowchart of a process 400 of an illustrative embodiment of a method for displaying a culture media image on a timeline display screen. The process 400 begins at step 410, wherein a selection of a marker on a timeline associated with a culture media image is received. The selection can be received, for example, from an input, such as input 106, operated by a user.

After the marker selection is received, the process 400 moves to a step 420, wherein the image associated with the marker is displayed on the timeline display screen of a display, such as display 108. In some embodiments, the associated image may be displayed on a separate screen of a user interface.

After the culture media image is displayed, the process can move to a step 430, wherein an indication can be provided on the timeline of which image is being displayed. For example, the appearance of the marker associated with the image can be modified to distinguish from the markers associated with other culture media images. After an indication is provided as to which image is being displayed, the process concludes.

Figure 5:
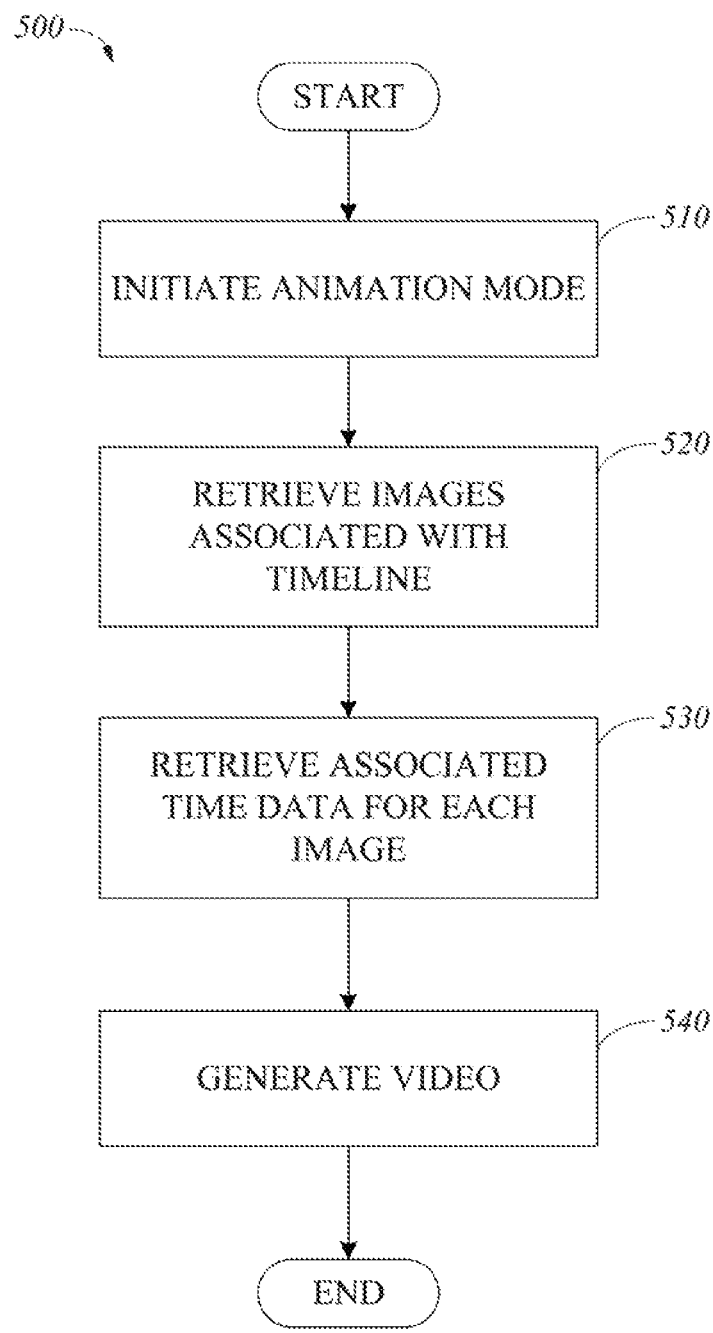
FIG. 5 depicts a flowchart of an embodiment of generating a video of a culture media in accordance with an illustrative embodiment of the present invention.

FIG. 5 depicts a flowchart of a process 500 of an illustrative embodiment of a method for providing a video of a culture media protocol associated with a timeline using a culture reading system such as culture reading system 110. The process 500 beings at a step 510, wherein an animation mode is initiated. The animation mode can be a part of a timeline display screen on the user interface of the culture reading system or can be displayed on a separate display screen. The animation mode can be initiated, for example, in response to receiving a selection on the timeline display screen. In some embodiments, a selection can be made using an input, such as input 106.

After animation mode is initiated, the process 500 moves to a step 520, wherein culture media images associated with the timeline associated with the culture media protocol are retrieved. The culture media images can be retrieved from a memory, such as memory 104, or from an imaging device, such as imaging device 124.

After the images associated with the timeline are retrieved, the process 500 moves to a step 530, wherein time data for each image is retrieved. The time data can be retrieved from a memory, such as memory 104, or from the imaging device.

After the time data for each image is retrieved, the process 500 moves to a step 540, wherein a video or animation is generated. The video can include each of the images associated with the timeline. In some embodiments, the images can be included in the video based on the time data associated with each image. For example, in some embodiments, the video can include each image in chronological order. The video can provide a time-lapse progression of bacterial growth on the culture media.

In some embodiments, the video or animation may be generated by an external image processor service, which can receive data from the culture reading system, generate the video or animation, and transmit the generated video or animation back to the culture reading system. In some embodiments, an external video processor service can generate a video in response to a user command, using a process similar to that described with respect to FIG. 5.

In some embodiments, a video or animation may be generated each time an image is captured, either by including each image associated with the timeline into a new video or by adding the most recent image to a previously generated video. The video or animation generated each time an image is captured may be stored on the culture reading system or, in embodiments in which an external video processor service generators the animation or video, stored on the external video processor service. The video or animation can be accessed on the culture reading system or transmitted from the external video processor service to the culture reading system in response to a command from a user.

Figure 6:
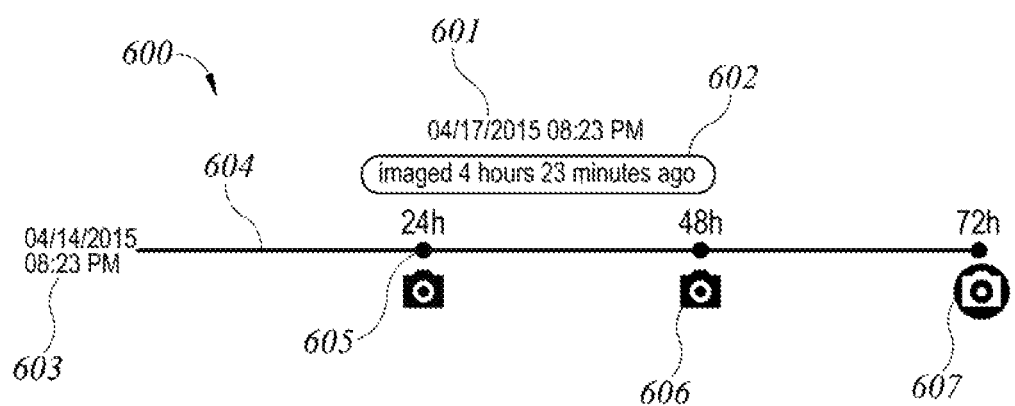
FIG. 6 depicts an embodiment of a timeline in accordance with an illustrative embodiment of the present invention.

FIG. 6 depicts an embodiment of a timeline 600 representing a culture media protocol and related data. The timeline 600 can be displayed on a timeline display screen. The timeline 600 includes a line 604. The line 604 provides a relative timescale in which the expected length of time from the beginning of the culture media protocol to the end of the culture media protocol is proportionately correlated to the physical length of the line 604, such that distances between points on the line are proportional to lengths of time between the times represented by those points. The timeline 600 includes a field 603 in which the date and time at which the culture media protocol was initiated is displayed. The timeline 600 also shows one or more markers representing times at which a culture media image is expected to be captured in accordance with the culture media protocol, including a marker 605. As demonstrated by marker 605, the markers representing times at which a culture media image is expected to be captured can be a circle or other shape positioned on the line 604. The markers representing times at which a culture media image is expected to be captured can also include a numerical indication of a length of time from the beginning of the protocol at which an image is expected to be taken. As shown in FIG. 6, expected times for images to be captured include 24 hours, 48 hours, and 72 hours. The timeline 600 also includes one or more markers indicating times at which culture media images were captured, including markers 606 and 607. Each of the markers representing a time at which a culture media image was captured can be positioned beneath the timeline in alignment with a position on the timeline representative of the time at which the culture media image was captured.

In some embodiments, a marker representing a time at which a culture media image was captured, such as markers 606 and 607, can be configured to provide a link to the associated culture media image. For example, the associated culture media image can be displayed in response to the selection of the marker representing the time at which the culture media image was captured, for example, via an input such as input 106. The timeline 600 can also provide a visual indication on the timeline of which culture media image is currently being displayed, for example, by modifying the appearance of the marker associated with the culture media image being displayed. Although the associated culture media image is not shown in FIG. 6, the timeline 600 is shown in a configuration indicating that the culture media image associated with marker 607 is being displayed. As demonstrated in FIG. 6, the marker 607 has a different appearance than the other markers representing times at which culture media images were captured. For example, the color of the marker 607 is different than the other markers. A circular border is also shown around the marker 607 to indicate that the culture media image associated with marker 607 is being displayed.

The timeline 600 also includes a field 601 in which the date and time in which the displayed image was captured is displayed. The timeline 600 also includes a field 602 in which the relative time between the time at which the displayed image was taken and the current time is displayed. In some embodiments, the field 602 can provide the relative time between time at which the most recent image was captured and the current time, for example, when no image is currently being displayed.

Figure 7:
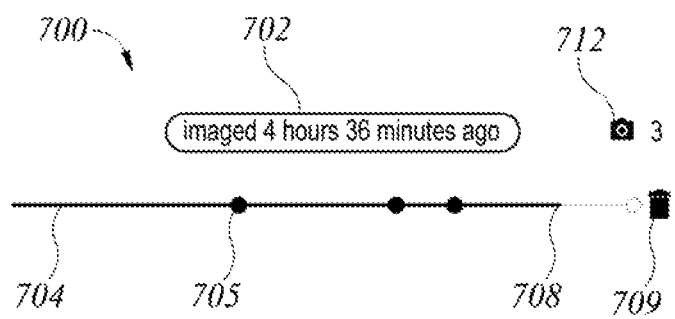
FIG. 7 depicts an alternate embodiment of a timeline in accordance with an illustrative embodiment of the present invention.

FIG. 7 depicts an embodiment of a timeline 700 representing a culture media protocol and related data. The timeline 700 can be displayed on a timeline display screen. The timeline 700 includes a line 704. The line 704 provides a relative timescale in which the expected length of time from the beginning of the culture media protocol to the end of the culture media protocol is proportionately correlated to the physical length of the line 704, such that distances between points on the line are proportional to lengths of time between the times represented by those points. The timeline 700 also shows one or more markers representing times at which a culture media image is expected to be captured in accordance with the culture media protocol, including a marker 705. As demonstrated by marker 705, the markers representing times at which a culture media image is expected to be captured can be a circle or other shape positioned on the line 704. The timeline 700 also includes a field 702 in which the relative time between the time at which the most recent image was captured and the current time is displayed. In some embodiments, the field 702 can provide the relative time between the time at which a displayed image was captured and the current time. The timeline 700 also includes a visual indication 708 on the line 704 of the amount of time elapsed since the initiation of the protocol. Accordingly, the visual indication 708 also indicates the current time within the culture media protocol. As shown in FIG. 7, the visual indication 708 can be a change in color and/or width of the line 704 from the start of the line 704 to the position on the timeline associated with the current time. In some embodiments, the visual indication 708 can include a change in the size and/or shape of the line 704. The timeline 700 can also include a visual indicator 709 indicating that the culture media has been discarded and/or that the culture media protocol has been terminated. As shown in FIG. 7, the indicator 709 is in the shape of a trash bin or other graphical indicia. In FIG. 7, the indicator 709 is shown beyond the end point of the timeline. However, in some embodiments, the indicator 709 can be positioned in alignment with a position on the timeline representative of the time at which the media was discarded or the protocol terminated.

The timeline 700 further includes a visual indicator 712 that indicates a number of images actually captured by an image device of the culture media. In some embodiments, the indicator 712 can be selectable in order to display the associated images of the culture media, or to display a different display screen on the user interface that allows for navigation between and/or selection of one of the culture media images indicated by the indicator 712. In some embodiments a display screen displaying the timeline 700 can allow for navigation to a second display screen having a timeline with alternative or more detailed information, such as, for example, the timeline 600 of FIG. 6.

FIGS. 8-10 each show an example of an embodiment of a timeline display screen. The timeline display screens shown in FIGS. 8-10 are each in a different stage of a culture media protocol.

FIG. 8 depicts an embodiment of a timeline display screen having a timeline 800 representing a culture media protocol and related data at a stage in the culture media protocol in which no images have been captured. The timeline 800 includes a line 804. The line 804 provides a relative timescale in which the expected length of time from the beginning of the culture media protocol to the end of the culture media protocol is proportionately correlated to the physical length of the line 804, such that distances between points on the line are proportional to lengths of time between the times represented by those points. The timeline 800 also shows one or more markers representing times at which a culture media image is expected to be captured in accordance with the culture media protocol, including the marker 805. As demonstrated by marker 805, the markers representing times at which a culture media image is expected to be captured can be a circle or other shape positioned on the line 804. The timeline display screen also includes a culture media image field 814. The culture media image field 814 can be configured to display a culture media image captured during the culture media protocol. In some embodiments, the culture media image field 814 can be configured to display the most recent culture media image captured during the protocol. In the timeline of FIG. 8, a graphic indicator 816 is displayed in the culture media image field 814 to indicate that no culture media image is available. The indicator 816 includes a symbol with a slash running diagonally through it. The timeline 800 also includes a field 802 in which the relative time between the time at which the most recent image was captured and the current time is displayed. Since no image has been taken in the example of FIG. 8, the indicator 802 provides a textual indication that no image is available.

The timeline 800 also includes a visual indication 808 on the line 804 of the amount of time elapsed since the initiation of the protocol. Accordingly, the visual indication 808 also indicates the current time within the culture media protocol. As shown in FIG. 8, the visual indication 808 can be a change in color and/or width of the line 804 from the start of the line 804 to the position on the timeline associated with the current time. The timeline 800 further includes a visual indicator 812 that indicates a number of images actually captured by an image device of the culture media. Since no images have been captured in the example of FIG. 8, the indicator 812 indicates that 0 images have been captured.

The timeline 800 also includes graphical indicia representing an image capture button 818, a media transport button 819, and a termination button 820. The image capture button 818 can be selected to cause the culture reading system to instruct the imaging device to capture an image at the current time. In some embodiments, automated equipment, such as an automated track system, can be provided to move culture media to various locations within a laboratory setting. The media transport button 819 can be configured to cause the removal of the culture media associated with the media protocol from the incubator instrument and the delivery to a particular location on the incubator instrument or destination at an associated workbench. The termination button 820 can be selected to cause the culture media reading system to terminate the protocol. When the protocol is terminated, the culture reading system can instruct the imaging device to stop capturing images. In some embodiments, when the protocol is terminated, the culture reading system will stop tracking time.

FIG. 9 depicts an embodiment of a timeline display screen having a timeline 900 representing a culture media protocol and related data at a stage in the protocol in which the culture media protocol has been completed and 3 images have been captured. The timeline 900 includes a line 904. The line 904 provides a relative timescale in which the expected length of time from the beginning of the culture media protocol to the end of the culture media protocol is proportionately correlated to the physical length of the line 904, such that distances between points on the line are proportional to lengths of time between the times represented by those points. The timeline 900 also shows one or more markers representing times at which a culture media image is expected to be captured in accordance with the culture media protocol, including the marker 905. As demonstrated by marker 905, the markers representing times at which a culture media image is expected to be captured can be a circle or other shape positioned on the line 904. The timeline display screen also includes a culture media image field 914. The culture media image field 914 can be configured to display a culture media image captured during the culture media protocol. In some embodiments, the culture media image field 914 can be configured to display the most recent culture media image captured during the protocol. In the timeline of FIG. 9, a culture media image 922 is displayed in the culture media image field 914. The timeline 900 also includes a field 902 which the relative time between the time at which the most recent image was captured and the current time is displayed. The field 902 indicates that the most recent image was captured 4 hours and 32 minutes ago.

The timeline 900 also includes a visual indication 908 on the line 904 of the amount of time elapsed since the initiation of the protocol. Accordingly, the visual indication 908 also indicates the current time within the culture media protocol. As shown in FIG. 9, the visual indication 908 can be a change in color and/or width of the line 904 from the start of the line 904 to the position on the timeline associated with the current time. As shown in FIG. 9, the entire protocol has been completed. The timeline 900 further includes a visual indicator 912 that indicates a number of images actually captured by an image device of the culture plate. As shown in FIG. 9, the indicator 912 indicates that 3 images have been captured.

The timeline 900 also includes an image capture button 918, a media transport button 919, and a termination button 920. The image capture button 918 can be selected to cause the culture reading system to instruct the imaging device to capture an image at the current time. The media transport button 919 can be configured to cause the removal of the culture media associated with the media protocol from the incubator instrument and the delivery to a particular location on the incubator instrument or destination at an associated workbench in embodiments having an automated track system. The termination button 920 can be selected to cause the culture media reading system to terminate the protocol. When the protocol is terminated, the culture reading system can instruct the imaging device to stop capturing images. In some embodiments, when the protocol is terminated, the culture reading system will stop tracking time.

FIG. 10 depicts an embodiment of a timeline display screen having a timeline 1000 representing a culture media protocol and related data at a stage in the culture media protocol after 3 culture media images have been captured and before the expected end time of the culture media protocol. As shown in FIG. 10, the culture media protocol represented by the timeline 1000 has been terminated. Termination of the protocol is indicated by an indicator 1009. The timeline 1000 includes a line 1004. The line 1004 provides a relative timescale in which the expected length of time from the beginning of the culture media protocol to the end of the culture media protocol is proportionately correlated to the physical length of the line 1004, such that distances between points on the line are proportional to lengths of time between the times represented by those points. The timeline 1000 also shows one or more markers representing times at which a culture media image is expected to be captured in accordance with the culture media protocol, including the marker 1005. As demonstrated by marker 1005, the markers representing times at which a culture media image is expected to be captured can be a circle or other shape positioned on the line 1004. The timeline also includes a culture media image field 1014. The culture media image field 1014 can be configured to display a culture media image captured during the culture media protocol. In some embodiments, the culture media image field 1014 can be configured to display the most recent culture media image captured during the protocol.

In the timeline of FIG. 10, a culture media image 1022 is displayed in the culture media image field 1014. The timeline 1000 also includes a field 1002 which the relative time between the time at which the most recent image was captured and the current time is displayed. The field 1002 indicates that the most recent image was captured 4 hours and 36 minutes ago.

The timeline 1000 also includes a visual indication 1008 on the line 1004 of the amount of time elapsed since the initiation of the protocol. Accordingly, the visual indication 1008 also indicates the current time within the culture media protocol. As shown in FIG. 10, the visual indication 1008 can be a change in color and/or width of the line 1004 from the start of the line 1004 to the position on the timeline associated with the current time. The timeline 1000 further includes a visual indicator 1012 that indicates a number of images actually captured by an image device of the culture media. As shown in FIG. 10, the indicator 1012 indicates that 3 images have been captured.

Figure 11:
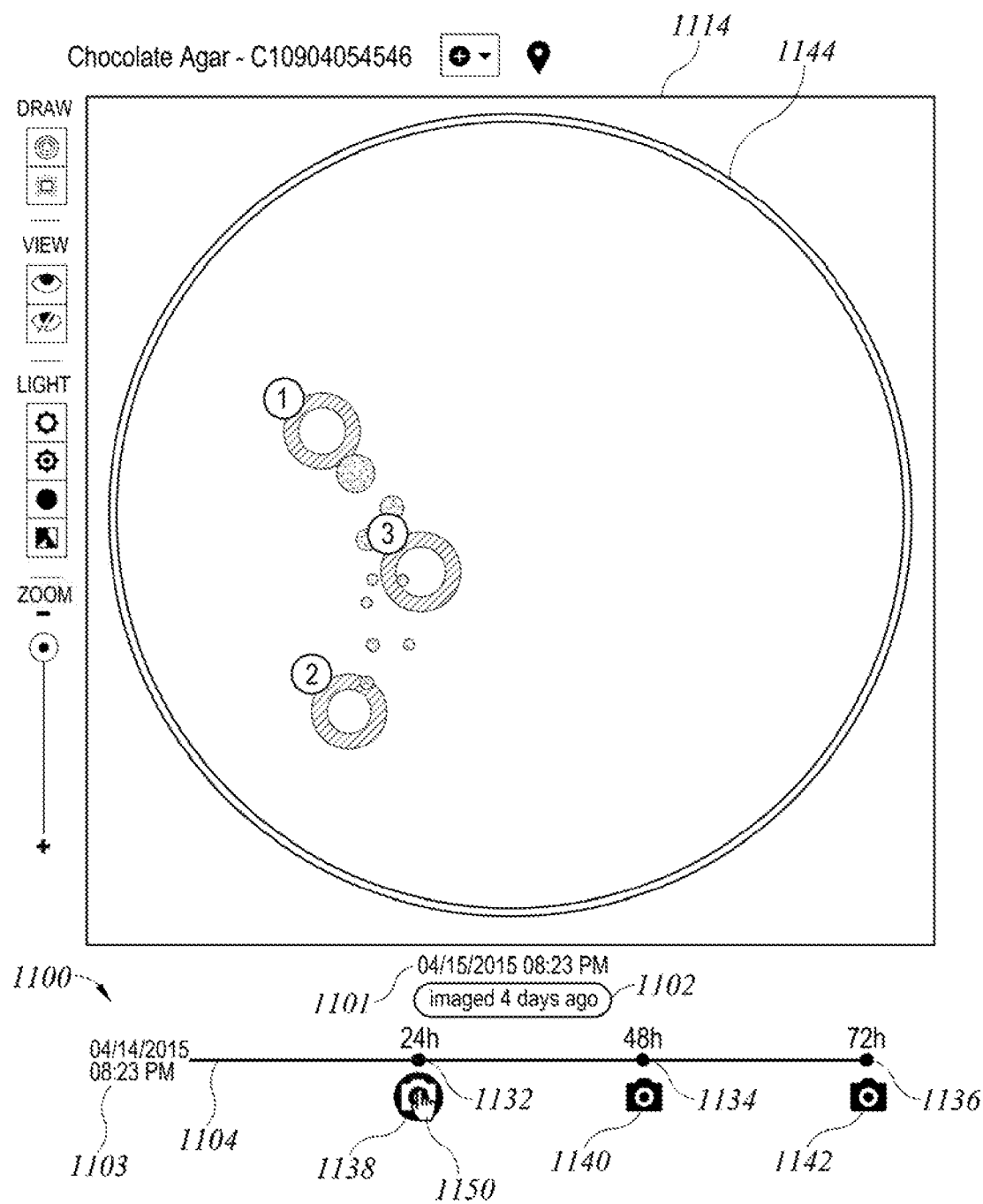
FIG. 11 depicts an embodiment of a timeline on a timeline display screen in accordance with an illustrative embodiment of the present invention.
Figure 12:
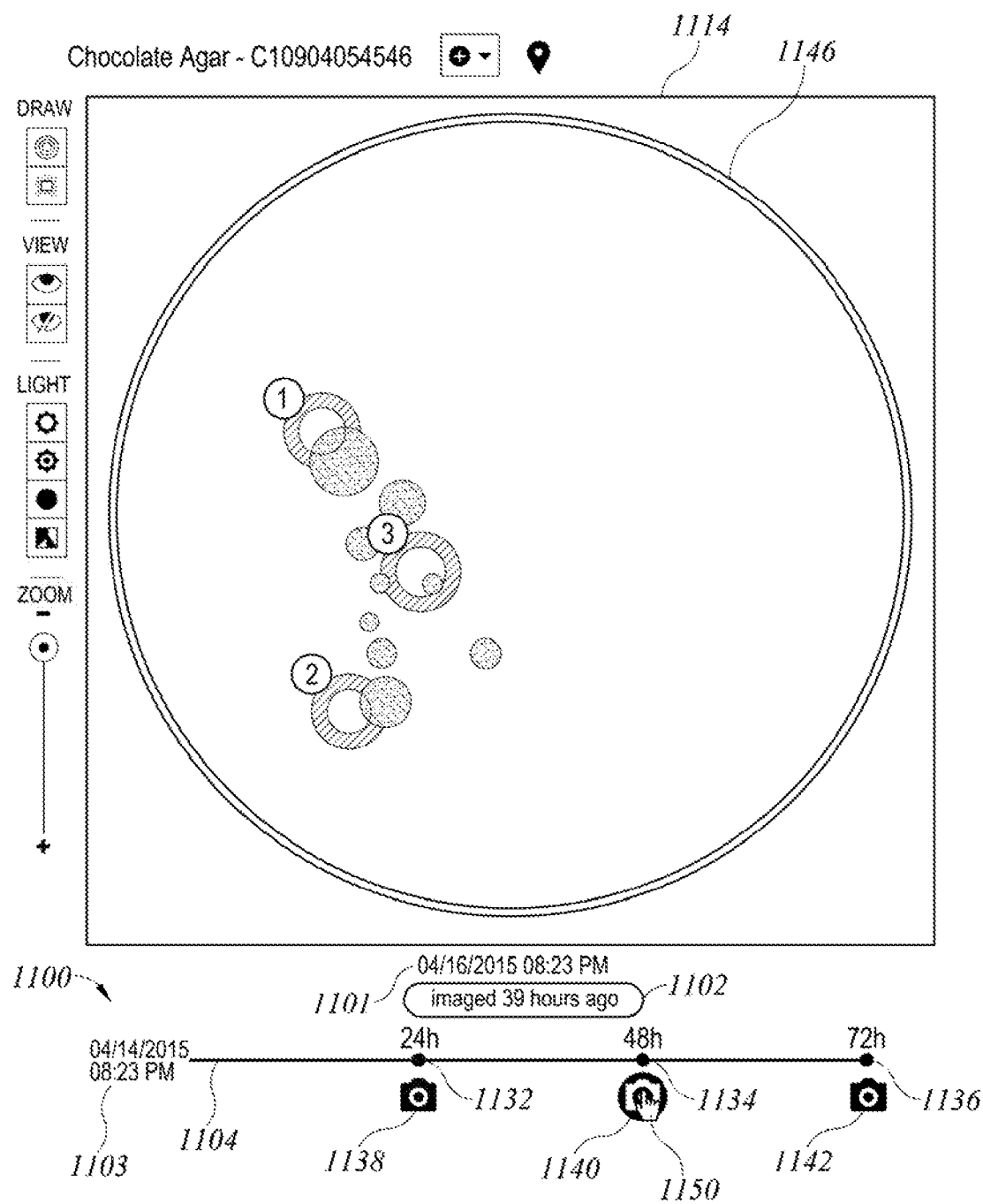
FIG. 12 depicts an embodiment of a timeline on a timeline display screen in accordance with an illustrative embodiment of the present invention.
Figure 13:
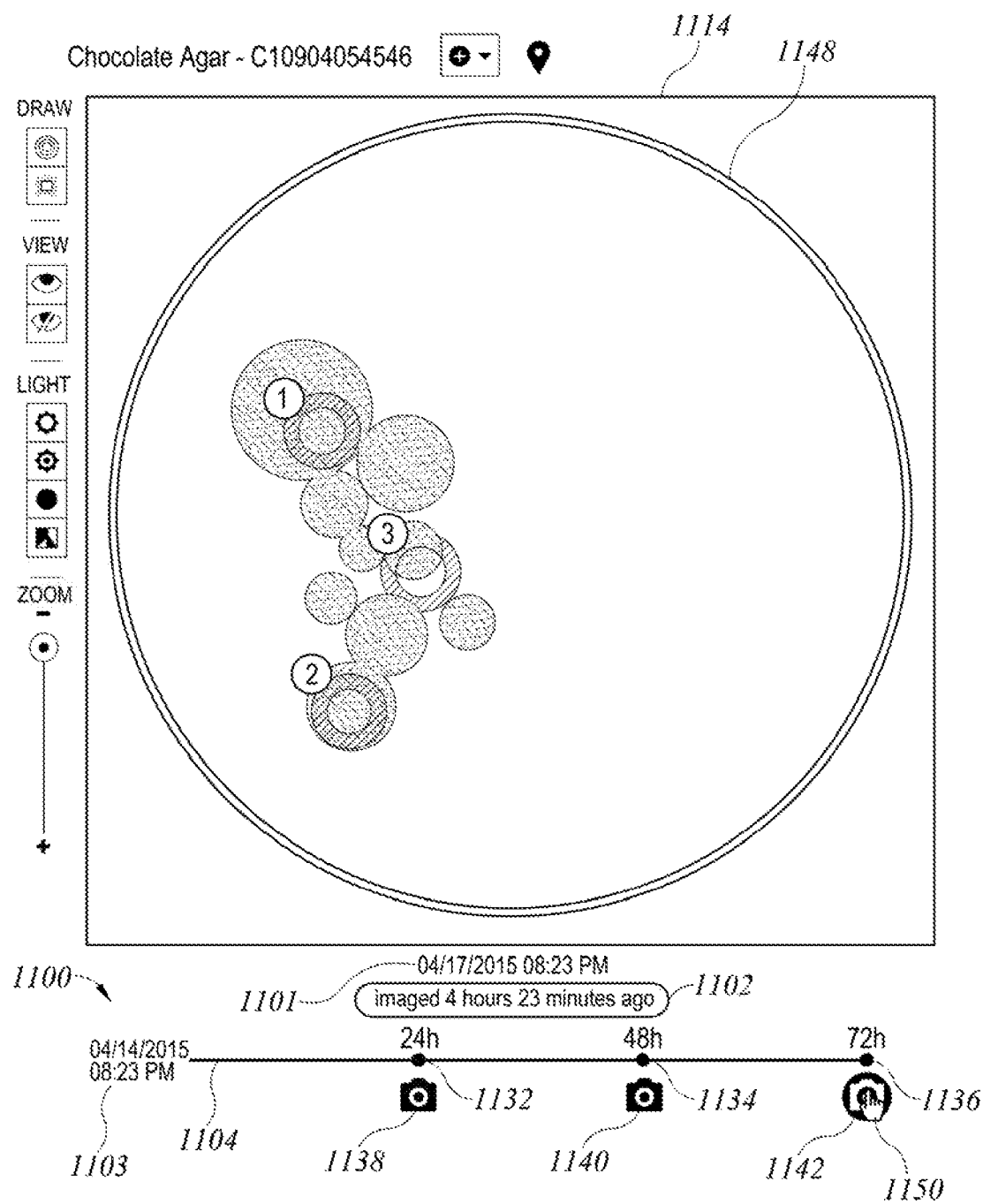
FIG. 13 depicts an embodiment of a timeline on a timeline display screen in accordance with an illustrative embodiment of the present invention.

The timeline 1000 also includes an image capture button 1018, a media transport button 1019, and a termination button 1020. The image capture button 1018 can be selected to cause the culture reading system to instruct the imaging device to capture an image at the current time. The media transport button 1019 can be configured to cause the removal of the culture media associated with the media protocol from the incubator instrument and the delivery to a particular location on the incubator instrument or destination at an associated workbench in embodiments having an automated track system. The termination button 1020 can be selected to cause the culture reading system to terminate the protocol. When the protocol is terminated, the culture reading system can instruct the imaging device to stop capturing images. In some embodiments, when the protocol is terminated, the culture reading system will stop tracking time and the image capture button 1018 and a termination button 1020 will become unavailable for selection by removing them from view modifying the ability to select the buttons by disabling their functionality or changing their appearance to indicate unavailability FIGS. 11-13 show an example of a timeline display screen displaying a timeline 1100 and an image field 1114. The timeline 1100 includes a line 1104. The line 1104 provides a relative timescale in which the expected length of time from the beginning of the culture media protocol to the end of the culture media protocol is proportionately correlated to the physical length of the line 1104, such that distances between points on the line are proportional to lengths of time between the times represented by those points. The timeline 1100 includes a field 1103 in which the date and time at which the culture media protocol was initiated is displayed. The timeline 1100 also includes one or more markers representing times at which a culture media image is expected to be captured in accordance with the culture media protocol, including the markers 1132, 1134, and 1136. The markers 1132, 1134, and 1136 can be a circle or other shape positioned on the line 1104. The markers 1132, 1134, and 1136 can also include a numerical indication of a length of time from the beginning of the protocol at which an image is expected to be taken. As shown in FIGS. 11-13, expected times for images to be captured include 24 hours, 48 hours, and 72 hours. The timeline 1100 also includes one or more markers indicating times at which culture media images were captured, including markers 1138, 1140 and 1142. Each markers representing a time at which a culture media image was captured can be positioned beneath the timeline in alignment with a position on the timeline representative of the time at which the culture media image was captured. As shown in FIGS. 11-13 the images corresponding to markers 1138, 1140, and 1142 were captured at the expected times represented by markers 1132, 1134, and 1136.

As demonstrated in FIGS. 11-13, one of the markers 1138, 1140, and 1142 on the timeline 1100 can be selected in order to display the associated culture media image in the image field 1114. The timeline 1100 can also provide a visual indication on the timeline of which culture media image is currently being displayed, for example, by modifying the appearance of the marker 1138, 1140, or 1142 associated with the culture media image. FIG. 11 shows the timeline display screen when the marker 1138 has been selected in order to display an image 1144 associated with marker 1138. A culture media image can be selected via an input operated by a user. In some embodiments, a cursor 1150 on the display screen can be manipulated to select the marker associated with the culture media image. As shown in FIG. 11, the marker 1138 has a different appearance than that of the markers 1140 and 1142. A marker can change in appearance in response to selection in order to indicate which image is currently being displayed on the timeline display screen. For example, the color of the marker 1138 is different than that of markers 1140 and 1142. A circular border is also shown around the marker 1138 to indicate that the culture media image associated with marker 1138 is being displayed. FIG. 12 shows the timeline display screen when the marker 1140 has been selected in order to display an image 1146 associated with marker 1140. FIG. 13 shows the timeline display screen when the marker 1142 has been selected in order to display an image 1148 associated with marker 1142.

The timeline 1100 also includes a field 1101 that can display the date and time at which a displayed image was captured. The timeline 1100 also includes a field 1102 that indicates the relative time between the time at which a displayed image was captured and a current time.

FIGS. 6-13 show various embodiments of timelines including markers representing times at which a culture media image is expected to be captured in accordance with the culture media protocol and markers indicating times at which culture media images were captured. As described with respect to FIG. 1, it is contemplated that similar markers can be employed for other events associated with a culture media protocol that are expected to occur or that have occurred. Examples of representative events include removal of the culture media from an incubator or incubation system, placement of the culture media into the incubator or incubation system, and the collection or processing of data related to the culture media, such as, for example, the processing of an image of the culture media by a digital image analysis algorithm. In some embodiments, a marker can be aligned with a position on the timeline that correlates to an interim result provided by a data processing algorithm, such as a digital image analysis algorithm. In some embodiments, a marker can be aligned with a position on the timeline that correlates to a final result provided by a data processing algorithm, such as a digital image analysis algorithm. Each marker can be associated with data related to the culture media protocol event which the marker represents. In some embodiments, a display field may be configured to display data associated with a most recent event of the culture media protocol or to display data associated with a selected marker on the timeline.

In some embodiments, a timeline can include markers associated with a plurality of different types of culture media protocol events, such as, for example, the start of the culture media protocol, the end of a culture media protocol, the capturing of an image of the culture media, removal of the culture media from an incubator or incubation system, placement of the culture media into the incubator or incubation system, and the collection or processing of data related to the culture media, such as, for example, the processing of an image of the culture media by a digital image analysis algorithm. In some embodiments, a timeline as described herein can be utilized for a culture media protocol in which the culture media is not digitally imaged. For example, a timeline in accordance with the embodiments described herein can be utilized for a blood culture bottle protocol or broth incubation protocol in which digital imaging may not always be performed. As described herein, the timeline can include one or more markers associated with one or more non-imaging events of the culture media protocol.

Implementations disclosed herein provide systems, methods and apparatus for timeline control. One skilled in the art will recognize that these embodiments may be implemented in hardware, software, firmware, or any combination thereof.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A system for providing a timeline representing a culture media protocol for a culture media, the system comprising:
    a computer system comprising:
        a user interface configured to display the timeline and a field for optional display of a culture media image; and
        a processor configured to:
            receive the culture media protocol for the culture media;
            generate the timeline on the user interface based on the culture media protocol;
            monitor time on the timeline;
            receive one or more culture media images related to the culture media protocol;
            associate each of the one or more culture media images with a position on the timeline that correlates to a time at which the culture media image was captured; and
            generate and display a selectable marker for each culture media image associated with the timeline, the selectable marker being aligned with the position on the timeline that correlates to the time at which the culture media image was captured.

2. The system of claim 1, wherein the processor is further configured to:
    receive a selection of one of the selectable markers; and
    display the culture media image associated with the selected marker.

3. The system of claim 1, further comprising an incubation system comprising:
    an incubator housing at least one culture media having a plurality of microorganisms; and
    an imaging device configured to capture an image of the at least one culture media.

4. The system of claim 3, wherein the culture media protocol comprises one or more intended times for capturing a culture media image, wherein the computer system is configured to transmit instructions to the imaging device to capture a culture media image at each of the intended times for capturing a culture media image.

5. The system of claim 1, wherein the processor is further configured to:
    receive a plurality of culture media images related to the culture media protocol;
    receive instructions to initiate an animation mode; and
    generate a video of the plurality of culture media images, wherein the plurality of culture media images are presented in chronological order based on the times at which the plurality of culture media images were captured.

6. The system of claim 1, wherein the processor is further configured to:
    receive a plurality of culture media images related to the culture media protocol;
    detect one or more reference points on the culture media based on the plurality of culture media images; and
    orient each culture media image such that the one or more reference points are in the same position in each culture media image.

7. The system of claim 1, wherein the timeline provides a relative timescale for the culture media protocol in which an expected duration of time for the culture media protocol is correlated to a length of the timeline.

8. The system of claim 1, wherein the processor is configured to modify the timeline in response to an unexpected culture media protocol event.

9. The system of claim 1, wherein the culture media protocol comprises one or more expected times for a culture media image to be captured, wherein the processor is configured to generate a marker on the timeline for each expected time for a culture media image to be captured.

10. The system of claim 1, wherein the processor is configured to update the timeline in response to the occurrence of a culture media protocol event in real time or near real time.

11. A method for providing a timeline representing a culture media protocol for a culture media, the method comprising:
    receiving the culture media protocol for the culture media;
    generating the timeline on a user interface based on the culture media protocol;
    monitoring time on the timeline;
    receiving one or more culture media images related to the culture media protocol;
    associating each of the one or more culture media images with a position on the timeline that correlates to a time at which the culture media image was captured; and
    generating a selectable marker for each culture media image associated with the timeline, the selectable marker being aligned with the position on the timeline that correlates to the time at which the culture media image was captured.

12. The method of claim 11, further comprising:
    receiving a selection of one of the selectable markers; and
    displaying the culture media image associated with the selected marker.

13. The method of claim 11, further comprising an incubation system comprising capturing an image of the culture media using an imaging device.

14. The method of claim 13, wherein the culture media protocol comprises one or more intended times for capturing a culture media image, wherein the method further comprises transmitting instructions to the imaging device to capture a culture media image at each of the intended times for capturing a culture media image.

15. The method of claim 11, further comprising:
    receiving a plurality of culture media images related to the culture media protocol;
    receiving instructions to initiate an animation mode; and generating a video of the plurality of culture media images, wherein the plurality of culture media images are presented in chronological order based on the times at which the plurality of culture media images were captured.

16. The method of claim 11, further comprising:

receiving a plurality of culture media images related to the culture media protocol;

detecting one or more reference points on the culture media based on the plurality of culture media images; and orienting each culture media image such that the one or more reference points are in the same position in each culture media image.

17. The method of claim 11, wherein the timeline provides a relative timescale for the culture media protocol in which an expected duration of time for the culture media protocol is correlated to a length of the timeline.

18. The method of claim 11, further comprising modifying the timeline in response to an unexpected culture media protocol event.

19. The method of claim 11, wherein the culture media protocol comprises one or more expected times for a culture media image to be captured, wherein the method further comprises generating a marker on the timeline for each expected time for a culture media image to be captured.

20. The method of claim 11, further comprising updating the timeline in response to the occurrence of a culture media protocol event in real time or near real time.

* * * * *